United States Patent Office 3,065,048

Patented Nov. 20, 1962

3,065,048

PROCESS FOR PREPARING HEAVY METAL TELLURIDES

John B. Conn, Westfield, and James V. Magee, South Orange, N.J., assignors to Merck & Co., Inc., Rahway, N.J., a corporation of New Jersey No Drawing. Filed Jan. 6, 1959, Ser. No. 785,134
12 Claims. (Cl. 23—50)

This invention relates generally to compounds containing tellurium. More particularly, it is concerned with heavy metal salts of tellurium and with a new method of preparing such substances. Still more specifically, it is concerned with a novel synthesis of heavy metal tellurides by a process which comprises the alkaline reduction of tellurium with zinc.

Metal tellurides, such as those wherein the metal is zinc, cadmium or lead are semi-conductors of importance in the electronics industry. For instance, the tellurides of zinc and cadmium, when suitably activated, have photoconducting properties. The cadmium compounds on activation with a small amount of copper become broad spectrum photoconductors having particular sensitivity at the red end of the spectrum. Such compounds are useful in the so-called "magic eye" devices and in some color television systems. Cadmium telluride is also useful as an electronic refrigerant and for use as a solar battery body. Activated lead telluride finds application in electronic cooling devices and in the field of power generation since it is of value in the direct conversion of heat to electricity.

As electronic chemicals, it is of utmost importance that these tellurides be ultra-pure, that is substantially free of metals other than those used as activators. In their ultra-pure state, the metal tellurides are known as intrinsic tellurides. They are used in making important electronic chemicals.

The desirable electronic properties appear when the balance of electrical charges in the ultra-pure compound is disturbed by the presence of imperfections. These may be vacancies caused by a slight compositional imbalance or by the incorporation of certain types of foreign atoms (activators) into the molecule. The activators are normally metals of groups in the periodic table of elements which bracket the groups of the main constituent elements. For instance, copper and silver of group IB are common activators for tellurides and selenides of zinc and cadmium, zinc and cadmium falling in group IIB of the periodic table. The amount of activator must be rigorously controlled and activation has ordinarily been accomplished heretofore by first obtaining the telluride in the highly pure state (the intrinsic form) and then incorporating a measured amount of the desired activator. This step of introducing the desired "impurity" is also referred to as "doping."

It will be appreciated, therefore, that any feasible synthesis of metal tellurides must be capable of producing ultra-pure material for use in the electronic industry as well as meeting other requirements such as high yield and freedom from health and safety hazards.

It is an object of the present invention to provide a method whereby ultra-pure tellurides may be prepared from impure tellurium in essentially quantitative yields. A more definite object is a process wherein tellurium is reduced with zinc in a strongly alkaline reaction medium. Still another and important object is a process wherein the zinc telluride formed by strongly alkaline reduction of the free element is soluble in the reaction medium. An additional object of the invention is preparation of heavy metal tellurides from the alkali-soluble zinc telluride. A further object is a process whereby "activation" or "doping" of heavy metal tellurides may be conveniently carried out during the synthesis of such compounds. These and other objects will be evident from the ensuing discussion of the invention.

According to this invention, it has now been discovered that treatment of tellurium with metallic zinc in a strongly alkaline reaction medium leads to reduction of the tellurium to telluride and formation of a solution of zinc telluride which, when an excess of zinc is employed, is formed substantially free of any metallic impurities originally present in the tellurium. The chemistry of this reduction process may be represented by the equation:

$$\text{(1)} \quad Zn+Te+4OH^- \rightarrow Te^= + Zn(OH)_4^=$$

The resulting zinc telluride may be recovered from solution in a highly pure state by reducing the alkalinity of the solution; alternatively, other heavy metal tellurides may be produced by treating the solution with a water-soluble salt of such other metal, whereupon the alkali-insoluble heavy metal telluride precipitates and is recovered by known methods.

The purity of the tellurium used as the starting material in our process is not critical. In fact, one of the features of the invention is that it makes possible the production of high purity heavy metal tellurides from the commercial grade tellurium which normally contains large amounts of iron and other contaminating metals. It is preferred to charge the tellurium to the reduction medium in powdered form in order to provide a large surface area for contact with the zinc.

In carrying out our process, the tellurium and zinc are intimately contacted or brought together in a solution of alkali metal hydroxide. We prefer to employ an excess of zinc over that required by the stoichiometry of the reaction for production of zinc telluride. This excess zinc reduces or converts to insoluble tellurides any contaminating heavy metals, such as iron, that may be present. The amount of excess is not critical, and can be varied with good results from about 1% to as much as 100% of theory. In a preferred embodiment of the process, we employ about a 40–60% excess of zinc over that required for reduction of tellurium. Since the zinc telluride is soluble in the reaction medium, the insoluble heavy metal impurities may thus be removed by filtration before precipitation of zinc telluride. As in the case of tellurium, it is desirable that the zinc be in a fine state of subdivision; we prefer to use granulated zinc as the reducing agent.

As the alkaline reaction medium, we employ an aqueous solution of alkali metal hydroxide of sufficient strength to solubilize the zinc telluride that is formed. The finding that zinc telluride is soluble in strong alkali is one of the important features of the invention since it renders possible the separation of heavy metal impurities (which are not soluble) and also permits the metathesis of zinc telluride to other heavy metal tellurides.

In the preferred embodiment of the invention, we utilize a 35–65% aqueous solution of alkali metal hydroxide as the reaction medium, with a concentration of 40–50% being most satisfactory. Zinc telluride has a solubility of about 1.05 moles per 1000 grams of 11.7 molar alkali metal hydroxide. Thus, the ratio of tellurium to base at the start of our process should not exceed 1.08 moles of tellurium per thousand grams of 11.7 molar alkali metal hydroxide (e.g., 1.05 moles of tellurium per 1000 grams of 45% potassium hydroxide. An alkali concentration of above 35% permits the reduction of reasonable amounts of tellurium without exceeding the solubility of zinc telluride. It will, of course, be appreciated by those skilled in this art that more dilute alkali could be used satisfactorily in our process but to preclude the premature precipitation of zinc telluride it would then be necessary to reduce the amount of zinc telluride produced per unit volume.

Any of the alkali metal hydroxide, such as potassium, sodium or lithium hydroxides, are suitable in practicing this new process. However, potassium hydroxide is preferred when high purity zinc telluride is desired since such tellurides may then be readily recovered without risk of contamination with alkali metal salts.

The alkaline reduction of tellurium discussed above is preferably carried out at elevated temperatures of about 50–80° C. although a range of about 35–100° C. may be utilized if desired. The reaction is exothermic so that the application of external heat is not normally required.

At the outset of the process polytelluride ions form as transient intermediates. These are very highly colored, the polytelluride ion being inky purple. This color is conveniently used as a ready visual index to the course of the reaction. When the characteristic purple color substantially disappears from the solution, the reduction stage of the process is complete. The solution is then normally filtered to remove any insoluble materials, thus insuring the recovery of heavy metal tellurides of high purity.

Recovery of zinc telluride from the alkaline reduction mixture, or preparation of a heavy metal telluride other than zinc is brought about upon completion of the reduction. The zinc compounds are precipitated from solution by reducing the hydroxide ion concentration of the solution. This may be accomplished by any suitable means such as by acidification, dilution with water or carbonation, i.e. treatment of the solution with carbon dioxide or a source of carbon dioxide. We prefer to recover the zinc compositions by treatment of the alkaline solution with carbon dioxide, a step which may be expressed by the equation:

(2) $Zn(OH_4^{=}+Te^{=}+2CO_2 \rightarrow ZnTe\downarrow+2CO_3^{=}+2H_2O$

In order to obtain well-crystallized material which is air stable, the carbonation step is carried out slowly and at elevated temperatures in the range of about 60–100° C. The resultant zinc telluride is conveniently isolated by filtration, and dried after displacement of the reaction liquors by washing with a suitable volatile solvent. If desired, the reaction medium may be treated with an acid such as a hydrohalic acid, sulfuric acid or acetic acid to reduce the hydroxide ion concentration and precipitate the zinc telluride, or the same result can be attained by dilution of the medium with water.

Alternatively, heavy metal tellurides other than zinc may be prepared from the alkaline reduction medium containing the soluble zinc telluride. By treating the reduction mixture with a solution of a water-soluble heavy metal salt the heavy metal telluride precipitates immediately. In referring to heavy metals throughout the discussion of this invention, we mean those metals whose sulfides, selenides or tellurides have a solubility in water of less than 1 mg./l. of solution.

Examples of compositions which may be made by this process are cadmium telluride, lead telluride, copper telluride, silver telluride, mercury telluride, tin telluride, bismuth telluride, manganese telluride, iron telluride, cobalt telluride, nickel telluride and the like. We prefer to employ the theoretical amount of heavy metal salt required for the reaction, particularly when ultra-pure tellurides are being prepared since contamination of the end product with excess heavy metal is thus substantially eliminated. Any water-soluble salt of the heavy metal, such as a chloride, nitrate, acetate and the like may be employed in the metathesis.

Aging or digestion of the reaction mixture serves to increase the particle size of the heavy metal telluride and to improve its stability, and this digestion, although not necessary, is a part of our preferred process. Optimum results are obtained with an aging period of 2–8 hours at elevated temperatures of from about 60–100° C. After completion of the aging period, the mixture is treated to reduce the hydroxide ion concentration by any of the methods previously described. This serves to convert any remaining zincates to solid basic zinc carbonate. These materials are then removed along with any solid alkali metal salts from the heavy metal telluride by digestion of the recovered solids with an acid such as acetic acid. When the water-soluble heavy metal salt employed in this metathesis reaction has been suitably purified, there is obtained by this process an ultra-pure heavy metal telluride suitable for electronic uses.

The following examples are given for purposes of illustration and not by way of limitation:

EXAMPLE 1

*Zinc Telluride*

To a three-necked flash fitted with agitator and gas inlet is added 560 grams of potassium hydroxide pellets and 560 ml. of distilled water. Nitrogen is bubbled through the hot alkali solution. To this solution is added 64 grams (0.5 gram-atom) of tellurium powder and 65 grams (1 gram-atom) of granulated zinc. The mixture is stirred in order to keep the zinc granules in rapid motion. Within a few seconds the gray suspension changes into an inky purple solution; the heat evolution from the reaction mixture is sufficient to maintain the temperature at about 80° C. The purple solution fades and disappears after about 105 minutes to give a nearly colorless solution. This solution is filtered with nitrogen pressure into a second flask equipped with an agitator and gas inlet, and a mixture of nitrogen and carbon dioxide added to the filtered solution with continuous stirring. After a short time solid zinc telluride forms as an orange-red granular precipitate. After absorption of carbon dioxide ceases, as indicated by a fall in the reaction temperature, the solid zinc telluride is isolated by filtration, washed with water and methanol, and air-dried. A substantitally quantitative yield of high purity zinc telluride is obtained.

EXAMPLE 2

*Zinc Telluride*

640 grams (5 gram-atoms) of tellurium powder and 488 grams (7.5 gram-atoms) of zinc granules are added, in a nitrogen atmosphere, to a solution of 5600 grams of potassium hydroxide in 5600 ml. of distilled water. The addition is carried out at room temperature. The temperature gradually rises to about 40° C., the tellurium dissolving to form a purple solution. The purple color fades after about five hours, at which time the solution is filtered and carbonated as described in Example 1. The solid zinc telluride is filtered and air-dried; it weighs 894 grams. Digestion of this material in 50% acetic acid on a steam bath followed by washing with water and methanol yields 874 grams of substantially pure zinc telluride.

EXAMPLE 3

*Zinc Telluride*

320 grams of powdered tellurium and 244 grams of zinc granules are added at room temperature to a solution of 2240 grams of sodium hydroxide in 3360 ml. of water under a nitrogen atmosphere. After the resulting purple color fades, the solution is treated as in Example 2 to obtain ultra-pure zinc telluride.

EXAMPLE 4

*Cadmium Telluride*

To a hot solution of 3360 grams of potassium hydroxide in 3360 ml. of water is added 384 grams of tellurium powder and 300 grams of granulated zinc. The resulting mixture is stirred at about 80° C. under a nitrogen atmosphere until it becomes substantially colorless. The solution is then filtered with nitrogen pressure into a flask equipped with agitator, gas inlet and addition funnel.

To this solution is added dropwise with continuous stirring 782 ml. of an oxygen free purified cadmium chloride solution containing 337 grams of cadmium chloride. The brown precipitate of cadmium telluride which forms immediately is digested in the reaction mixture for five hours and then cooled to room temperature. A mixture of nitrogen and carbon dioxide gas is then bubbled through the mixture, and after absorption of carbon dioxide is essentially complete, the solid cadmium telluride is isolated by filtration and washed with water. Without drying, it is digested with six liters of 30% acetic acid in a nitrogen atmosphere at about 80° C. for four hours. The product is refiltered, washed with water and methanol, and dried in an inert atmosphere at 120° C. There is obtained 670 grams of high purity cadmium telluride.

When the cadmium chloride solution used above contains 0.01 mole percent of a water-soluble copper or silver salt, the resulting cadmium telluride is activated or "doped" with 0.01 mole percent of such metal.

EXAMPLE 5

*Lead Telluride*

To 1120 ml. of 50% aqueous potassium hydroxide is added 64 grams of tellurium powder and 50 grams of zinc granules. The resulting mixture is stirred at about 75–80° C. until the deep purple color disappears. It is then filtered into a flask equipped with agitator, gas inlet and addition funnel. To this reduced mixture is added 328 ml. of an oxygen free purified solution of lead subacetate containing 316 grams of lead per liter. The addition of the lead subacetate solution is carried out at about 75° C. with continuous agitation. The solid black lead telluride precipitates immediately upon addition of the lead solution; the hot suspension is digested for five hours, cooled to room temperature and saturated with carbon dioxide. The solid lead telluride is then filtered, washed with water and digested for 90 minutes in 1500 ml. of 30% acetic acid. It is then isolated by filtration, washed with water and methanol, and dried. There is thus obtained 156 grams of substantially pure lead telluride.

Addition of 0.01 mole percent of a water-soluble copper or silver salt to the lead subacetate solution used above yields lead telluride "doped" with 0.01 mole percent of copper or silver respectively.

Any departure from the above description which conforms to the present invention is intended to be included within the scope of the claims.

What is claimed is:

1. The process of producing zinc telluride which comprises intimately contacting tellurium with an amount of zinc in excess of the amount required for the formation of zinc telluride in a solution of an alkali metal hydroxide of sufficient strength to prevent precipitation of zinc telluride until the characteristic color of polytelluride ion substantially disappears, reducing the hydroxide ion concentration of such solution until zinc telluride precipitates from the solution and recovering the solid zinc telluride thus formed.

2. The process of claim 1 wherein the alkali metal hydroxide is potassium hydroxide.

3. The process of producing zinc telluride which comprises intimately contacting tellurium with an amount of zinc in excess of the amount required for the formation of zinc telluride in a solution of alkalia metal hydroxide, the ratio of tellurium to base being less than about 1.05 moles of tellurium per 1000 grams of 11.7 molar alkali metal hydroxide, reducing the hydroxide ion concentration of the resulting solution after substantial disappearance of the characteristic color of polytelluride ion therefrom until zinc selenide precipitates from the solutions and recovering the solid zinc telluride thus obtained.

4. The process of claim 3 wherein the hydroxide ion concentration of the solution is reduced by addition of carbon dioxide thereto.

5. The process of claim 4 wherein the alkali metal hydroxide is potassium hydroxide.

6. The process of producing a heavy metal telluride having a solubility in water of less than 1 mg./l. of solution selected from the group consisting of cadmium telluride, lead telluride, copper telluride, silver telluride, mercury telluride, tin telluride, bismuth telluride, iron telluride, cobalt telluride and nickel telluride that comprises intimately contacting zinc and tellurium in a solution of alkali metal hydroxide wherein the hydroxide ion concentration is sufficient to prevent precipitation of zinc telluride and treating the resulting solution with a water-soluble salt of said heavy metal after substantial disappearance therefrom of the characteristic color of polytelluride ion sufficient quantity to precipitate said heavy metal telluride and recovering the solid heavy metal telluride thus formed.

7. The process of claim 6 wherein the heavy metal is cadmium.

8. The process of claim 6 wherein the heavy metal is lead.

9. The process of producing a heavy metal telluride having a solubility in water of less than 1 mg./l. of solution selected from the group consisting of cadmium telluride, lead telluride, copper telluride, silver telluride, mercury telluride, tin telluride, bismuth telluride, iron telluride, cobalt telluride and nickel telluride that comprises intimately contacting tellurium with an amount of zinc in excess of the amount required for the formation of zinc telluride in a solution of an alkali metal hydroxide, the ratio of tellurium to base being less than about 1.05 moles of tellurium per 1000 grams of 11.7 molar alkali metal hydroxide, and treating the resulting solution with a water-soluble salt of said heavy metal after substantial disappearance therefrom of the characteristic color of polytelluride ion in sufficient quantity to precipitate said heavy metal telluride and recovering the solid heavy metal telluride thus formed.

10. The process of claim 9 wherein the alkali metal hydroxide is potassium hydroxide.

11. The process of claim 10 wherein the heavy metal is cadmium.

12. The process of claim 10 wherein the heavy metal is lead.

References Cited in the file of this patent

UNITED STATES PATENTS

| | | |
|---|---|---|
| 2,008,753 | Downing | July 23, 1935 |

FOREIGN PATENTS

| | | |
|---|---|---|
| 786,310 | Great Britain | Nov. 13, 1957 |

OTHER REFERENCES

Mellor: "Comprehensive Treatise on Inorganic and Theoretical Chemistry," Longmans, Green & Co., vol. XI, 1931, pages 29, 50, 52, 55, 56, 57, 60, 63 and 64.